United States Patent [19]

Dahbura

[11] Patent Number: 5,163,098
[45] Date of Patent: Nov. 10, 1992

[54] SYSTEM FOR PREVENTING FRAUDULENT USE OF CREDIT CARD

[76] Inventor: Abbud S. Dahbura, 1400 Indian La., Hagerstown, Md. 21740

[21] Appl. No.: 578,336

[22] Filed: Sep. 6, 1990

[51] Int. Cl.⁵ .............................................. H04K 1/00
[52] U.S. Cl. ...................................................... 380/24
[58] Field of Search ................................. 380/23, 24; 235/380–382.5

[56] References Cited

U.S. PATENT DOCUMENTS

| | | |
|---|---|---|
| 1,559,962 | 3/1978 | Lancto et al. . |
| 1,576,463 | 2/1977 | Kinker . |
| 3,906,460 | 9/1975 | Halpern . |
| 4,172,552 | 10/1979 | Case et al. . |
| 4,186,871 | 2/1980 | Anderson et al. .................... 380/24 |
| 4,264,782 | 4/1981 | Konheim . |
| 4,302,810 | 11/1981 | Bouricius et al. ..................... 380/24 |
| 4,321,672 | 3/1982 | Braun et al. . |
| 4,341,951 | 7/1982 | Benton . |
| 4,529,870 | 7/1985 | Chaum . |
| 4,591,704 | 5/1986 | Sherwood et al. . |
| 4,626,669 | 12/1986 | Davis et al. . |
| 4,630,201 | 12/1986 | White . |
| 4,633,037 | 12/1986 | Serpell .................................. 380/24 |
| 4,697,072 | 9/1987 | Kawana . |
| 4,707,592 | 11/1987 | Ware . |
| 4,745,267 | 5/1988 | Davis et al. . |
| 4,752,676 | 6/1988 | Leonard et al. ..................... 380/24 |
| 4,755,940 | 7/1988 | Brachtl et al. ....................... 380/24 |
| 4,757,537 | 7/1988 | Edelmann et al. .................. 380/24 |
| 4,757,543 | 7/1988 | Tamada et al. . |
| 4,775,784 | 10/1988 | Stark . |
| 4,804,826 | 6/1989 | Hertzen et al. . |
| 4,827,113 | 5/1989 | Rikuna ................................. 380/24 |
| 4,843,220 | 6/1989 | Haun . |
| 4,882,779 | 11/1989 | Rahtgen .............................. 380/24 |
| 4,965,568 | 10/1990 | Atalla et al. ......................... 380/24 |
| 4,977,595 | 12/1990 | Ohta et al. ........................... 380/24 |
| 4,995,081 | 2/1991 | Leighton et al. ..................... 380/24 |

FOREIGN PATENT DOCUMENTS

WO85/02927 7/1985 PCT Int'l Appl. .
2078410 6/1980 United Kingdom .

Primary Examiner—Thomas H. Tarcza
Assistant Examiner—David Cain
Attorney, Agent, or Firm—Fleit, Jacobson, Cohn, Price, Holman & Stern

[57] ABSTRACT

A credit card system uses an encryption algorithm to generate a first encoded text from the card number and a password supplied by the user. The card user is verified by comparison of the first encoded text with an encoded text recorded on the card. When the transaction is completed, the merchant generates a receipt containing a first verification code generated from the date and time of the transaction, the merchant's identification number, the password, and the card number. To receive payment, the merchant presents the receipt to the credit card center. The credit card center generates a second verification code from the card number, the password which is retrieved from the central database, the merchant number, and the time and date of the transaction. If the two verification codes match, the merchant is credited with the amount of the transaction.

19 Claims, 8 Drawing Sheets

5,163,098

SYSTEM FOR PREVENTING FRAUDULENT USE OF CREDIT CARD

TECHNICAL FIELD

This invention relates to the art of credit card transactions. In particular, the invention is a system which uses encryption algorithms to produce encoded texts for allowing a merchant to verify whether the user of a card is authorized and for allowing a central unit to verify requested payments from the merchants in an off-line manner.

BACKGROUND ART

Various systems have been proposed for preventing fraud in connection with transactions employing the use of a card, such as a credit card. These systems typically rely on the use of a password which is known only to the user. It is difficult to allow these systems to operate at a large variety of locations, however, because each location must be connected to a central database for matching the information on the card with the password. For example, in an automatic teller system associated with a bank, the ATM is connected with a central database for verifying the use of the card. In the normal credit card transaction, the merchant verifies the card by a telephone connection with a central station primarily to ascertain whether the card has been reported stolen.

The prior art systems do not lend themselves to a secure system capable of operating with a large number of merchants because of the need to connect directly each of the merchants with a central database for verifying the use of the cards. Further, while an ATM may be assumed to be honest because it is under the secure control of the bank, no such assumption can be made with respect to a merchant. Prior art systems do not protect against a merchant who knowingly allows use of a stolen card.

SUMMARY OF THE INVENTION

In accordance with the invention, a credit card system permits the secure use of credit cards by a large number of merchants without requiring central station verification of the card before each transaction is completed by the merchant. Additionally, the new system ensures that a dishonest merchant cannot submit an illicit transaction.

In overview, the system comprises a card, a machine operated by a merchant, and a central machine. These devices are operated to ensure that (1) a stolen card cannot be used even with the consent of a dishonest merchant, (2) a counterfeit card cannot be used, (3) carbon paper used for printing receipts are of no value, and (4) information read from the magnetic stripe on the card is of no value per se. It will be appreciated from the description below that the merchant need not verify the card by telephone and that the card need be of no special design.

The card has a magnetic stripe which carries card text, such as the card number, and a first encoded text. The user of the card is provided with a password which is preferably unique to him but need not be so. Merchants are supplied with machines for reading the card text and the first encoded text from the card and for recording transactions to be charged against the account of the card user.

When making a transaction, the card is passed through a card reader on the merchant's machine to read the card number and the first encoded text from the card. The machine is also provided with a keypad for allowing the user's password to be supplied to the machine. An encryption device in the merchant's machine operates in accordance with an encryption algorithm which receives the password and the card number as inputs and generates a second encoded text. This second encoded text is then compared to the first encoded text which has been read from the card to ascertain if the user is authorized.

If the first and second encoded texts are not identical, however, the machine will not permit the transaction to proceed and will allow a preset number of retries before refusing to allow further attempts to use the card. In addition, the card number of the user can be compared with numbers of lost or stolen cards. These numbers can be periodically loaded to and stored in the merchant's machine by the credit card center.

If the user is authorized, the merchant's machine allows the transaction to proceed. The merchant then supplies the amount of the transaction, and the machine provides a receipt for the transaction. The word "receipt" is used here broadly to mean any type of transaction record, including those which are written, electronically stored, or transmitted in any manner. Before printing the receipt, the merchant's machine generates a first verification code by an encryption algorithm which receives the number of the card, the time and date of the transaction, the merchant's identification number, and the password as inputs. The receipt includes a variety of information including the time and date of the transaction, the card number, the merchant's identification code, the amount of the transaction, and the first verification code. As an alternative to printing the first verification code on the transaction receipt, or in addition thereto, the first verification code can be stored with the transaction information in the merchant's machine, or on another medium, and can be transmitted electronically or shipped on the storage medium to the credit card center.

When the receipt is presented by the merchant to the credit card center for payment, a central machine obtains the information from the receipt. This can be manual, as by keying in the information from the receipt or by reading a bar code, or electronic, as by receiving the information electronically from the merchant's machine by the credit card center.

The central machine generates a second verification code from the information on the receipt and the password corresponding to that card which has been obtained from the database at the credit card center by using the same encryption algorithm as in the merchant's machine. The central machine then compares the first verification code contained on the receipt with the second verification code which has been generated at the center. If the two match, the merchant is credited with the amount of the receipt. If the codes do not match, the merchant is denied payment.

It should be noted that the verification code will be different for each transaction even if the user, the merchant, and the transaction amount are the same because the time and the date are inputs to the encryption algorithm. Moreover, it should be noted that the system does not depend on the decryption of the encoded texts or the verification codes. Instead, the system relies on the comparison of encoded texts or verification codes which have been generated by identical encryption algorithms.

DETAILED DESCRIPTION OF THE DRAWINGS

Figure 1:
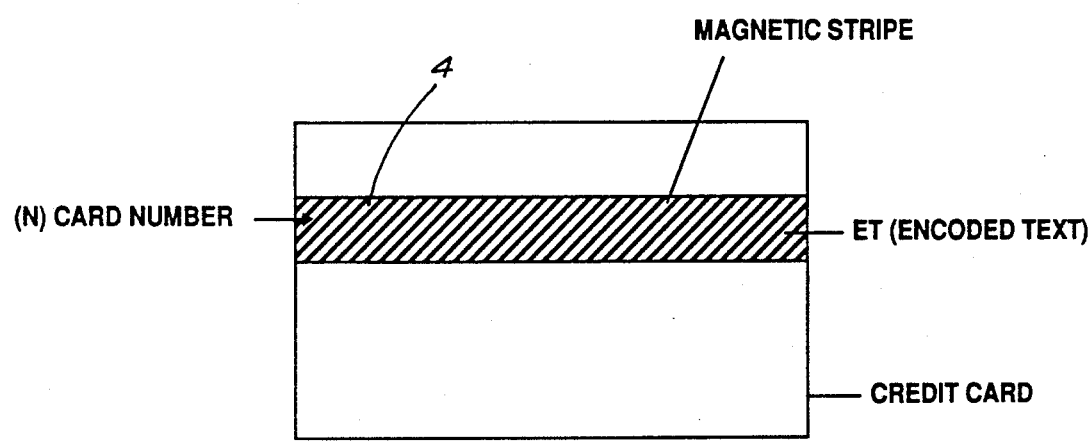
FIG. 1 is a rear view of a credit card in accordance with the invention.

FIG. 1 illustrates a credit card for use in the system of the invention. A card base 2 has a stripe 4, such as a magnetic stripe which contains information capable of being read by an appropriate reader such as those known in the art. The information contained on the stripe comprises a card text, which is preferably the number of the card, and a first encoded text which has been generated by an encryption algorithm.

Figure 2:
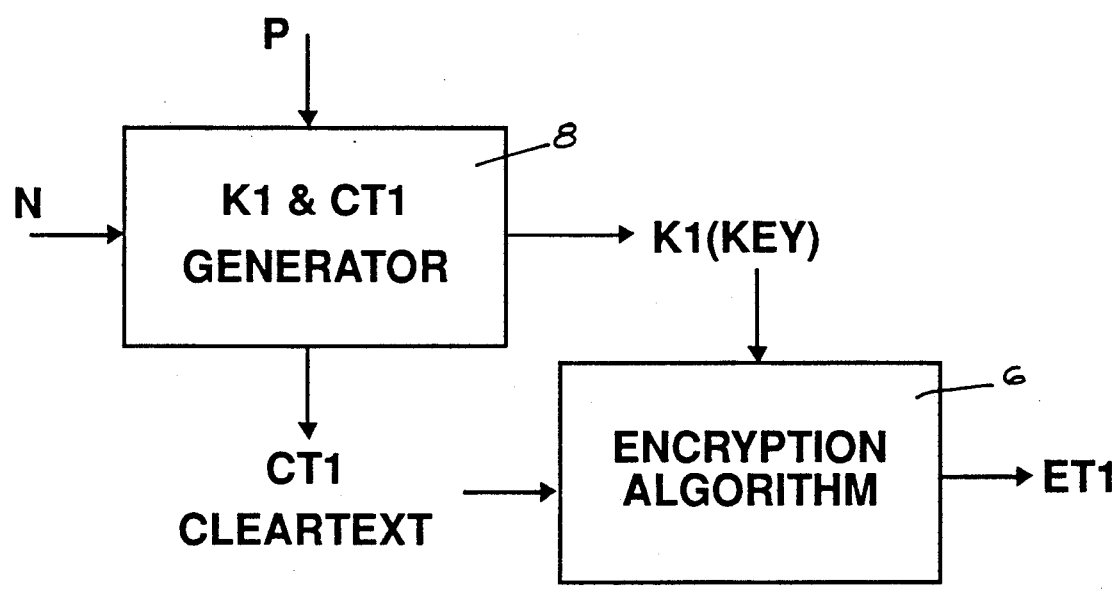
FIG. 2 illustrates the generation of an encoded text.

The generation of the first encoded text is illustrated in FIG. 2. The user of the card is given a password as well as a card number. While the card number may be easily ascertained from the card or the stripe, however, the password is not contained on the card and cannot be directly obtained.

With reference to FIG. 2, the generation of the first encoded text ("ET1") is accomplished by an electronic element 6, such as a microprocessor, which contains an encryption algorithm. The electronic element 6 receives as inputs a key ("K1") and a clear text ("CT1") and produces the ET1 in accordance with the algorithm and these inputs. The algorithm may be any of several which are known in the art, the key determining the manner in which the clear text is encrypted. The clear text and the key are generated by an electronic element 8 which receives the number of the card by reading the magnetic stripe, and the password from the user of the card.

The key and clear text may be generated, for example, by combining and/or alternating the alphanumeric characters of the card number and the password to produce key and clear text having the requisite characteristics for use by the algorithm.

Figure 3:
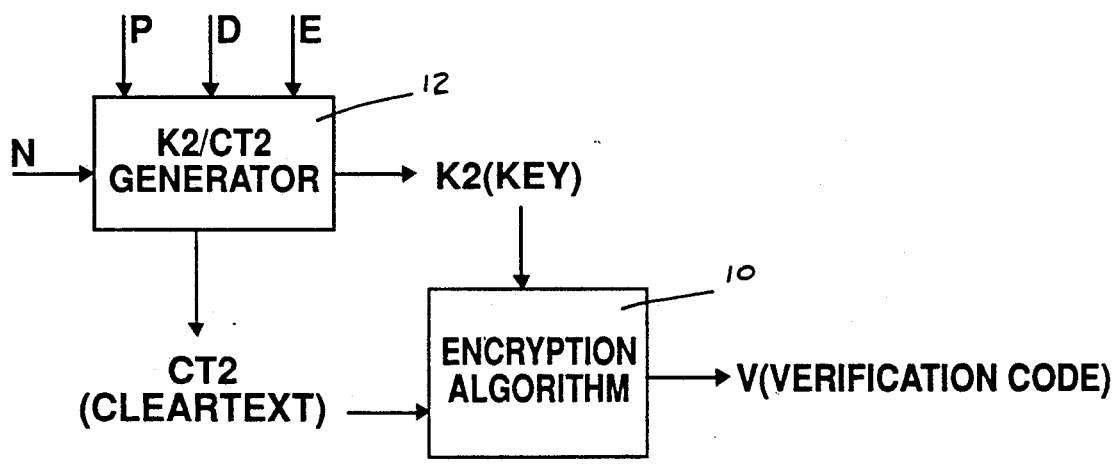
FIG. 3 illustrates the generation of a verification code.

If the card is verified and the transaction is allowed to proceed, as will be explained further below, a verification code is generated in a manner similar to that of the generation of the first encoded text. As illustrated in FIG. 3, an electronic element 10 is provided with an encryption algorithm which may be the same as that supplied to electronic element 6. Electronic element 10 receives a second clear text ("CT2") and a second key ("K2") from an electronic element 12 which generates K2 and CT2 from the password (P), the card number (N), the date of the transaction (D), and the identifying number of the merchant (E). The verification code is printed on a receipt for verification purposes at the central credit card station.

Figure 4:
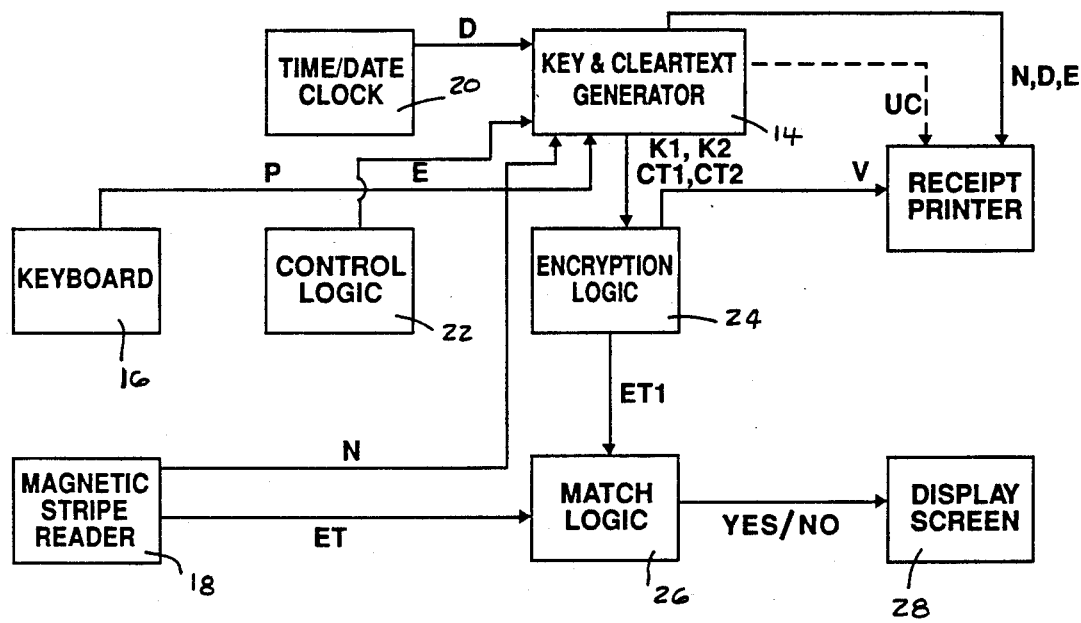
FIG. 4 is a block diagram of an apparatus for use by a merchant in accordance with the invention.

FIG. 4 is a block diagram of the machine used by the merchant to effect a transaction using the credit card. The keys K1 and K2 and clear texts CT1 and CT2 are generated by generator 14 as described above. The password is preferable supplied by an input keyboard 16, and the number of the card and the encoded text previously recorded on the card are obtained from the magnetic stripe on the card by reader 18. A clock 20 supplies the time and date to the generator 14, and control logic 22 supplies the merchant number and directs the generation of the verification codes and the first encoded text. The encryption logic means 24 is provided with an encryption algorithm as described above and generates the first encoded text and the verification code when supplied with key and clear texts from the generator 14. A match logic 26 compares the encoded text (ET) read from the card with the first encoded text (ET1) which has been generated from the first key and clear text and the result of the comparison is displayed on a screen 28. If the result of the comparison is positive, the generator 14 prints a receipt such as that shown in FIG. 6 which contains the card number, the date of the transaction, the amount of the transaction, and a verification code which is generated by encryption logic 24 as described above with respect to FIG. 3.

Figure 5:
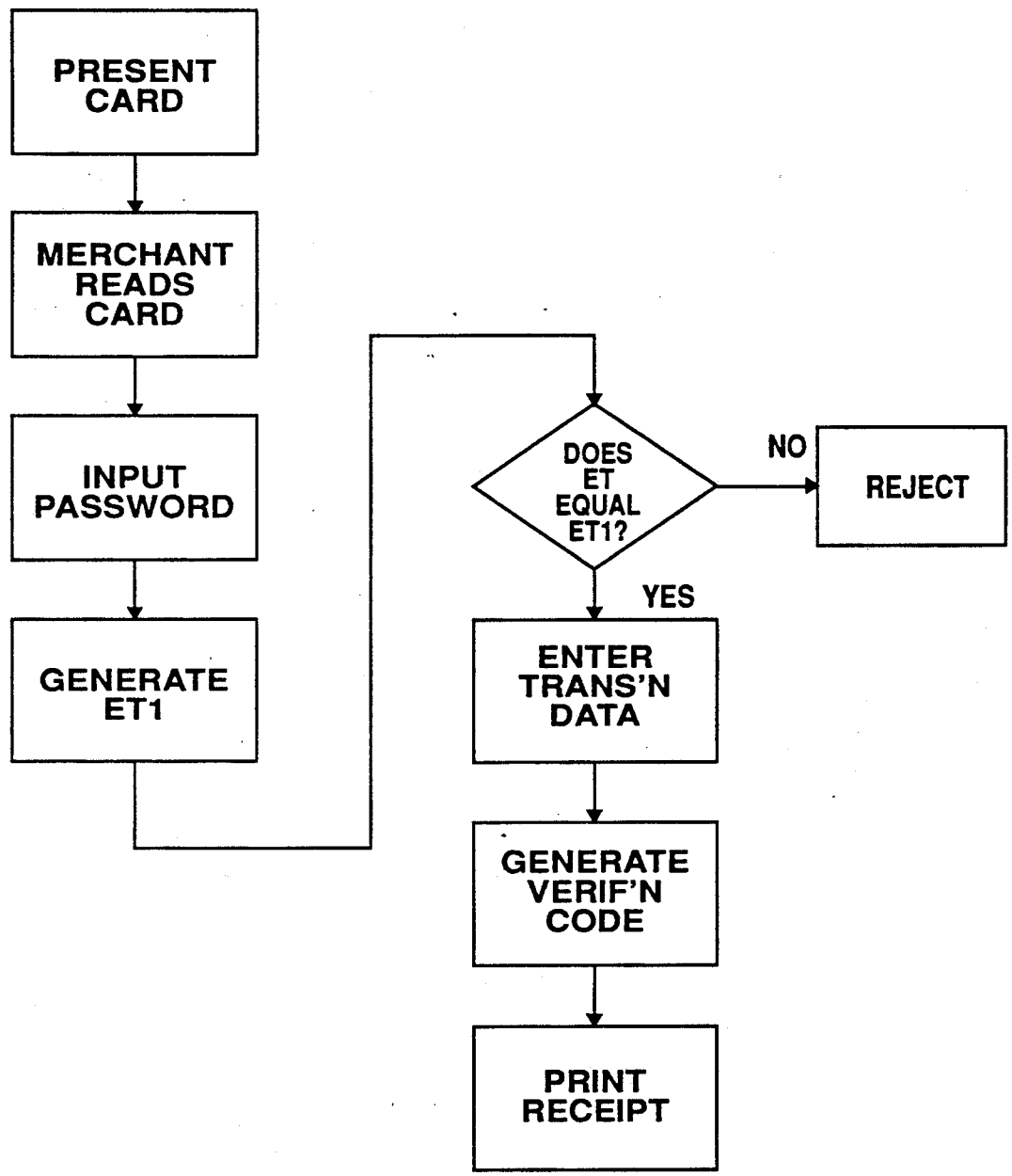
FIG. 5 is a flow chart showing the operation of the apparatus of FIG. 4.
Figure 6:
FIG. 6 is an example of a receipt printed by the apparatus of FIG. 4.

A preferred sequence of steps followed when making the transaction as set forth above are summarized in the flow chart of FIG. 5. The final step of the transaction at the merchant is to generate a receipt, and an example of such a receipt is shown in FIG. 6 It will be appreciated that the receipt need not be a "hard copy" and that it may be electronic and transmitted electronically to the credit card center without actually being printed.

Figure 7:
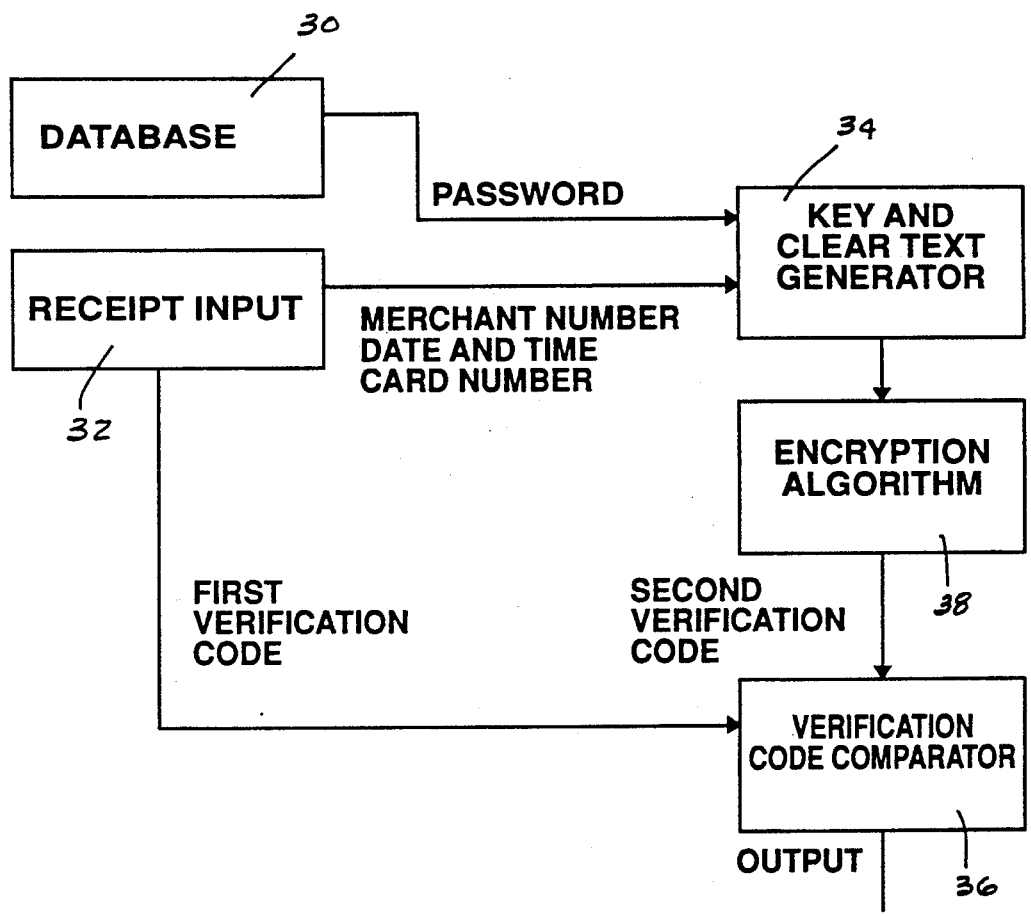
FIG. 7 is a block diagram of an apparatus located at the central credit card station.

FIG. 7 is a block diagram of a machine located at the credit card center. A database 30 has the passwords for each of the credit cards recorded in memory. The card number for a particular transaction is obtained from a receipt input device 32 which may be a keypad for manual input of the information from a receipt or a modem which receives the information electronically. The receipt input device also supplies the merchant number, date and time of the transaction and the card number to a key and clear text generator 34. The first verification code generated by the merchant and printed on the receipt is supplied by the receipt input device to a comparator 36 which also receives a second verification code generated by an encryption algorithm 38. The second verification code is generated as a function of key and clear texts generated by generator 34 in response to the password obtained from the database 30 and the merchant number, date and time of transaction, and card number which have been obtained from the receipt. Thus, the merchant number, the card number, and the password must be correct to produce a verification code which matches that generated by the merchant's machine and printed on the receipt. Use of the date and time of the transaction ensures that no two verification codes will be the same even for the same merchant, transaction amount and the same card user.

Figure 8:
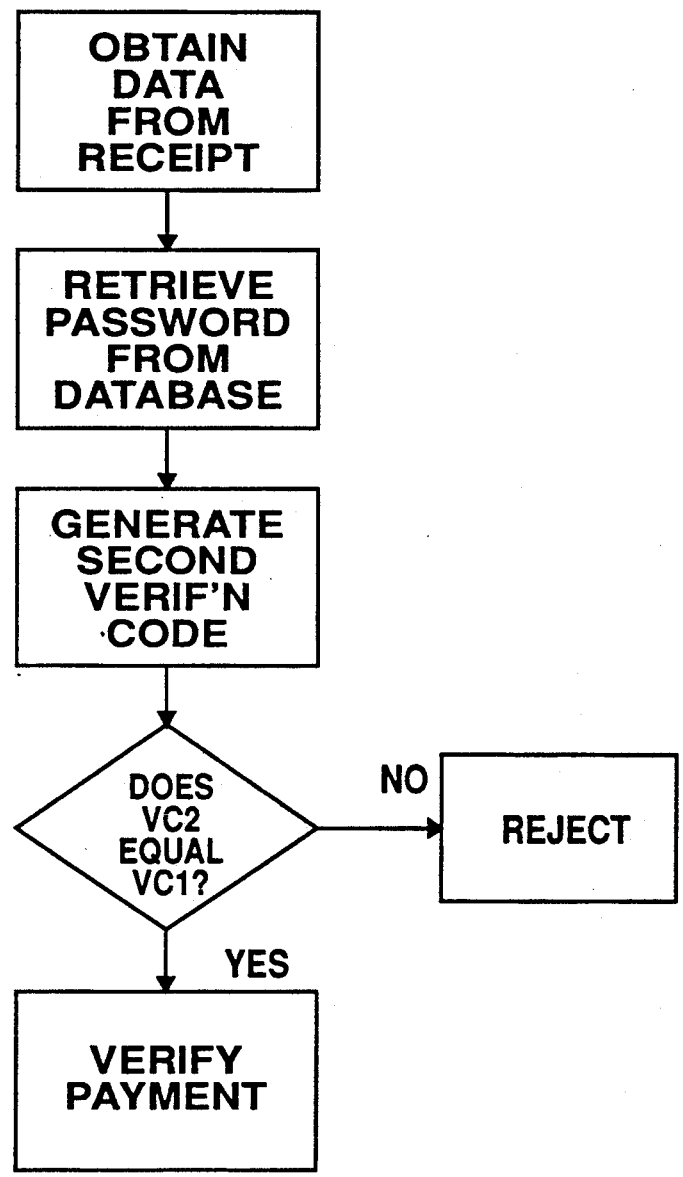
FIG. 8 is a flow chart showing the operation of the apparatus of FIG. 7.

The steps followed by the central credit card station to verify the transaction are shown in FIG. 8. If the verification codes generated by the merchant and that generated by the central station match, the transaction is verified and the merchant is credited with the amount of the transaction. If the two do not match, the transaction is rejected.

I claim:

1. A transaction verification system comprising:

a card having a first encoded text and a card text thereon which are capable of being read;

merchant means comprising:
  means for reading said first encoded text and card text,
  means for generating a second encoded text,
  means for comparing said first encoded text with said second encoded text,
  said means for generating producing a first verification code if said first encoded text is identical to said second encoded text, and
  means for producing a transaction receipt; and central means comprising:
  means for generating a second verification code comprising means for applying said card text, a pass code and a merchant text to an encryption algorithm and for indicating whether said first verification code is identical to said second verification code.

2. A transaction verification system according to claim 1, wherein said means for generating of said merchant means comprises encryption algorithm means for receiving said card text and a password as inputs and generating said second encoded text.

3. A transaction verification system according to claim 2, wherein said means for generating of said merchant means comprises encryption algorithm means for receiving said card text, said password, a time and date, and a merchant number as inputs and generating said first verification code.

4. A transaction verification system according to claim 3 wherein said central means comprises means for storing a plurality of passwords and means for generating said second verification code from one of said stored passwords.

5. A card for use in a transaction comprising a base and means on said base having readable information thereon, wherein said readable information comprises a card test and an encoded text which is generated as a function of said card text given to a user and a password such that said encoded text corresponds exclusively to the card text and the password for the card.

6. A card according to claim 5 wherein said card text is a card number.

7. A card according to claim 5 wherein said means on said base comprises a magnetic stripe.

8. Apparatus for use in performing a transaction comprising means for receiving information from a user, said information comprising a pass code, a card text, and a first encoded text, wherein said first encoded text being generated by an encryption algorithm from said pass code and said card text, means for generating a second encoded text by applying said pass code and said first text to an encryption algorithm identical to that used to generate said first encoded text, and means for comparing said first encoded text to said second encoded text; said means for generating a second encoded text comprises means for producing a key and a first clear text from said card text and said pass code and for applying said first clear text and said key to said encryption algorithm to produce said second encoded text; means for producing a verification code means for producing said verification code comprises means for applying said card text, said pass code, the time and data of the transaction and a merchant text to an encryption algorithm.

9. Apparatus according to claim 8 wherein said means for generating a second encoded text comprises means for producing a key and a first clear text from said card text and said password and for applying said first clear text and said key to said encryption algorithm to produce said second encoded text.

10. Apparatus according to claim 9 further comprising means for producing a verification code.

11. Apparatus according to claim 10 wherein said means for producing said verification code comprises means for applying said card text, said password, the time and date of the transaction and a merchant text to an encryption algorithm.

12. Apparatus for verifying a transaction comprising means for receiving a merchant text which identifies a merchant, a card text which identifies a card used in the transaction, a first verification code, and the time and date of the transaction from a transaction receipt, means for retrieving a password corresponding to said card from a database, and encryption means for applying said password, date, merchant text, and card text to an encryption algorithm to produce a second verification code, and means for comparing said first and second verification codes.

13. Apparatus according to claim 12 wherein said encryption means produces a key and a clear text from said password, merchant text, date, and card text and applies said key and clear text to said encryption algorithm.

14. Apparatus according to claim 13 wherein said card text comprises a card number.

15. The system of claim 2, wherein said encryption algorithm means generates the same output for the same inputs.

16. The system of claim 3, wherein said means for generating of said central means comprises encryption algorithm means is identical to said encryption algorithm means of said merchant means, which generates the same output for the same inputs.

17. The apparatus of claim 8, wherein the encryption algorithm generates the same output for the same inputs.

18. The apparatus of claim 12, wherein the encryption algorithm of the encryption means generates the same output for the same inputs.

19. A transaction verification system comprising:
  a card to be carried by a user and storing a first encoded text and a card text thereon, the first encoded text being generated according to a one-way algorithm in which the card text and a pass code assigned to the user are used to generate said first encoded text, said one-way algorithm generating the same output from the same inputs;
  merchant means comprising:
    means for reading the first encoded text and card text from a card;
    means for generating a second encoded text according to the one-way algorithm on the basis of said card text and the pass code supplied by a user of the card;
    means for comparing the first encoded text with the second encoded text;
    said means for generating producing a first verification code according to the one-way algorithm in said first encoded text is identical to said second encoded text; and
  central means comprising:
    means for generating a second verification code according to the one-way algorithm on the basis of the card text, the pass code and a merchant text; and
    means for comparing said second verification code with said first verification code for indicating whether the first verification code is identical to said second verification code.

* * * * *